United States Patent
Kikuchi

(10) Patent No.: US 11,370,688 B2
(45) Date of Patent: Jun. 28, 2022

(54) METHOD OF MOLDING OPTICAL ELEMENT AND OPTICAL ELEMENT MOLDING DIE

(71) Applicant: OLYMPUS CORPORATION, Hachioji (JP)

(72) Inventor: Kenji Kikuchi, Hino (JP)

(73) Assignee: OLYMPUS CORPORATION, Tokyo (JP)

( * ) Notice: Subject to any disclaimer, the term of this patent is extended or adjusted under 35 U.S.C. 154(b) by 135 days.

(21) Appl. No.: 16/820,797

(22) Filed: Mar. 17, 2020

(65) Prior Publication Data

US 2020/0216347 A1 Jul. 9, 2020

Related U.S. Application Data

(63) Continuation of application No. PCT/JP2018/031236, filed on Aug. 23, 2018.

(30) Foreign Application Priority Data

Sep. 25, 2017 (JP) .............................. JP2017-183873

(51) Int. Cl.
*C03B 11/08* (2006.01)
*C03B 11/12* (2006.01)
(Continued)

(52) U.S. Cl.
CPC ............ *C03B 11/08* (2013.01); *C03B 11/122* (2013.01); *B29C 43/361* (2013.01);
(Continued)

(58) Field of Classification Search
None
See application file for complete search history.

(56) References Cited

U.S. PATENT DOCUMENTS

| 7,559,214 B2 | 7/2009 | Nishikawa |
| 2003/0029332 A1 | 2/2003 | Matsuzuki et al. |
| 2007/0092592 A1* | 4/2007 | Chiang ............ B29D 11/00413 |
| | | 425/408 |

FOREIGN PATENT DOCUMENTS

| JP | 2002326824 A | 11/2002 |
| JP | 2004339039 A | 12/2004 |
| JP | 2005200284 A | 7/2005 |

OTHER PUBLICATIONS

International Search Report (ISR) (and English translation thereof) dated Nov. 6, 2018 issued in International Application No. PCT/JP2018/031236.
(Continued)

*Primary Examiner* — Lisa L Herring
(74) *Attorney, Agent, or Firm* — Holtz, Holtz & Volek PC

(57) ABSTRACT

Provided is a method of molding an optical element to obtain the molded optical element. The method includes: preparing a die set including an upper die having an upper molding surface, a lower die having a lower molding surface, a side die in which a through hole is formed, and a sleeve configured to accommodate the upper die, the lower die, and the side die; disposing a mold material on the lower molding surface after inserting the lower die into the through hole of the side die; heating the mold material; press molding the mold material with the upper die and the lower die to integrally move the side die and the lower die with respect to the upper die and the sleeve; and pushing the optical element upward by raising the lower die with respect to the side die and the sleeve.

3 Claims, 17 Drawing Sheets

(51) Int. Cl.
*B29D 11/00* (2006.01)
*B29C 43/36* (2006.01)

(52) U.S. Cl.
CPC ...... *C03B 2215/46* (2013.01); *C03B 2215/50* (2013.01); *C03B 2215/65* (2013.01); *C03B 2215/66* (2013.01)

(56) References Cited

OTHER PUBLICATIONS

Written Opinion dated Nov. 6, 2018 issued in International Application No. PCT/JP2018/031236.

* cited by examiner

FIG.16
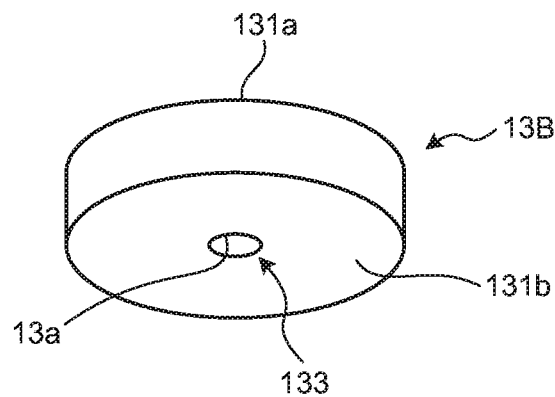
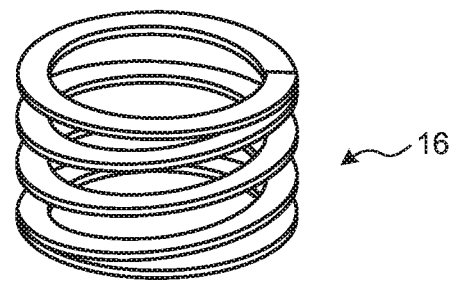
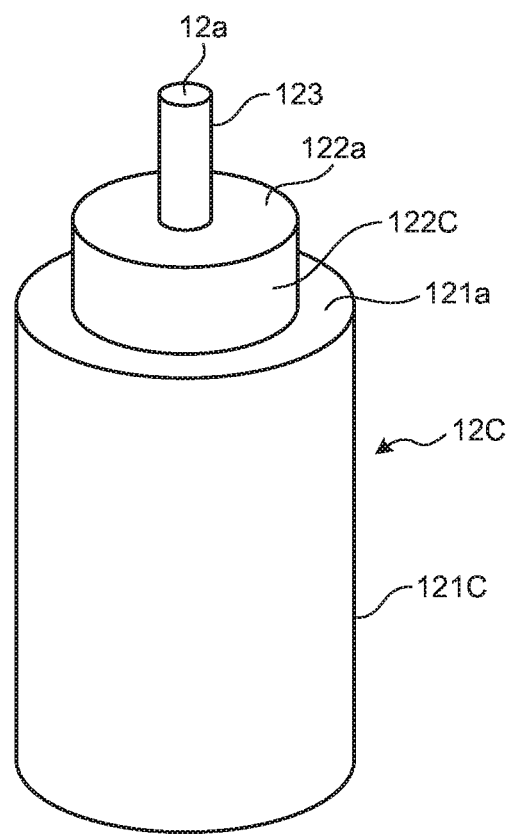

METHOD OF MOLDING OPTICAL ELEMENT AND OPTICAL ELEMENT MOLDING DIE

CROSS-REFERENCE TO RELATED APPLICATION

This application is a continuation of PCT International Application No. PCT/JP2018/031236 filed on Aug. 23, 2018, which designates the United States, incorporated herein by reference, and which claims the benefit of priority from Japanese Patent Application No. 2017-183873, filed on Sep. 25, 2017, incorporated herein by reference.

BACKGROUND

1. Technical Field

This disclosure relates to a method of molding an optical element and an optical element molding die.

2. Related Art

As one of methods for molding an optical element such as a glass lens, for example, as disclosed in JP 2004-339039 A, there is known a molding method in which the shape of a die is transferred to a glass material by heating and pressing the glass material (mold material) with the die. In the above-described method of molding an optical element, the cost including also the cost of post-steps can be reduced by molding also a side surface together with functional optical surfaces to be provided in upper and lower surfaces of an optical element.

In a molding method of the related art, as illustrated in FIG. 20, an optical element is molded with a die including an upper die 61 having an upper molding surface 61a, a lower die 62 having a lower molding surface 62a, and a side die 63 having a side molding surface 63a. Specifically, after a mold material M is disposed on the lower die 62 inserted into the side die 63 having a tubular shape as illustrated in the same drawing and heating is performed, the upper die 61 moves with respect to the lower die 62 as illustrated in FIG. 21; and thereby, the mold material M is press molded. Then, after the upper die 61 is removed as illustrated in FIG. 22, an optical element O is taken out of the die, as illustrated in FIG. 23, by suctioning an upper surface of the optical element O with a suctioning tool 70.

Here, in a case where the optical element O with a diameter of less than 1 mm which is very small is molded, for example, as illustrated in FIG. 24, in a case where a diameter D1 of the optical element O is smaller than a width W of the suctioning tool 70, it may not be possible to take out the optical element O after molding. In such a case, as illustrated in FIG. 25, after the optical element O after molding is pushed upward from the side die 63 by moving the lower die 62 with respect to the side die 63, the optical element O is taken out of the die by the suctioning tool 70.

However, in order for the lower die 62 to push out the optical element O after press molding as illustrated in FIG. 25, it is necessary to perform the press molding, as illustrated in FIG. 21, in a state where an extra height H equivalent to the push-out amount of the optical element O is provided between the side die 63 and the lower die 62. For this reason, in the molding method of the related art, when press molding is performed, it is not possible to perform a motion such as integrally moving (raising) the side die 63 and the lower die 62 with respect to the upper die 61 in a state where the extra height H is maintained and the height of the lower molding surface 62a in the side die 63 is maintained, and as illustrated in FIG. 21, it is only possible to move (lower) the upper die 61 with respect to the side die 63 and the lower die 62. Therefore, in the molding method of the related art, a molding device is required to be provided with a mechanism that independently drives only the upper die 61, and thus, the configuration of the molding device becomes complicated, which is a problem.

SUMMARY

In some embodiments, provided is a method of molding an optical element to obtain the molded optical element. The method includes: preparing a die set including an upper die having an upper molding surface, a lower die having a lower molding surface, a side die in which a through hole serving as a side molding surface is formed, and a sleeve configured to accommodate the upper die, the lower die, and the side die; disposing a mold material on the lower molding surface after inserting the lower die into the through hole of the side die in order for the lower molding surface to be positioned in the through hole of the side die; heating the mold material disposed in the through hole of the side die; press molding the mold material with the upper die and the lower die by pushing the side die upward using the lower die to integrally move the side die and the lower die with respect to the upper die and the sleeve in a state where a position of the lower molding surface in the through hole of the side die is maintained at a predetermined position; and pushing the optical element upward by raising the lower die with respect to the side die and the sleeve to move the lower molding surface in the through hole of the side die to a position which is higher than the predetermined position and at which a part of the optical element after molding protrudes from an upper surface of the side die.

In some embodiments, provided is an optical element molding die configured to mold an optical element. The die includes: an upper die having an upper molding surface; a side die in which a through hole serving as a side molding surface is formed; a lower die having a lower molding surface to be disposed in the through hole of the side die; and a sleeve configured to accommodate the upper die, the lower die, and the side die. The lower die is configured to come into a state where the lower die pushes the side die upward to move integrally with the side die with respect to the upper die and the sleeve in a state where a position of the lower molding surface in the through hole of the side die is maintained at a predetermined position, and a state where the lower die is raised with respect to the side die and the sleeve to move with respect to the upper die in order for the position of the lower molding surface in the through hole of the side die to reach a position which is higher than the predetermined position and which is in a vicinity of an upper surface of the side die.

The above and other features, advantages and technical and industrial significance of this disclosure will be better understood by reading the following detailed description of presently preferred embodiments of the disclosure, when considered in connection with the accompanying drawings.

BRIEF DESCRIPTION OF THE DRAWINGS

FIG. 16 is a perspective view illustrating a lower die, the side die, and an elastic member of an optical element molding die according to a third embodiment of this disclosure, and is a view in which facing surfaces of the lower die and the side die can be seen;

DETAILED DESCRIPTION

Hereinafter, embodiments of a method of molding an optical element and an optical element molding die according to this disclosure will be described with reference to the drawings. Incidentally, this disclosure is not limited to the following embodiments, and the following embodiments include also configuration elements that can be easily replaced by the persons skilled in the art, or substantially the same configuration elements.

Configuration of Molding Device

Figure 1:
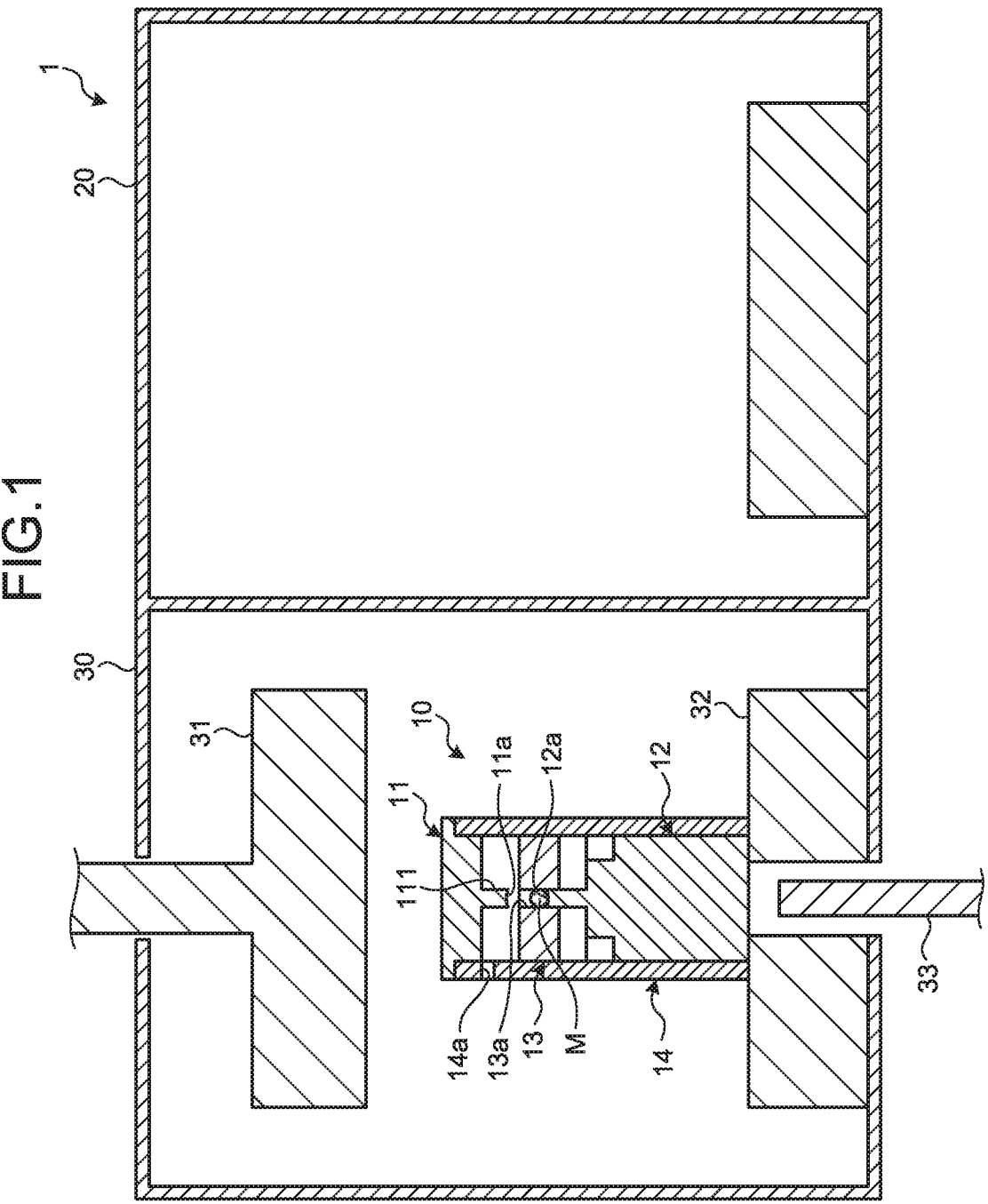
FIG. 1 is a cross-sectional view illustrating the configuration of main parts of a molding device including an optical element molding die according to a first embodiment of this disclosure.

A molding device 1 molds an optical element (for example, a glass lens) by press molding a mold material (for example, a glass material) M that is heated and softened. As illustrated in FIG. 1, the molding device 1 includes mainly a die set (optical element molding die) 10, a gas replacement chamber 20, and a molding chamber 30.

In the gas replacement chamber 20, air inside the die set 10 which is transported by a transport arm (not illustrated) or the like is replaced with an inert gas such as nitrogen. The die set 10 after subjected to the gas replacement is transported to the molding chamber 30 by the transport arm (not illustrated).

The molding chamber 30 includes an upper plate 31 and a lower plate 32 that heat, press mold, and cool the transported die set 10 in a state where the die set 10 is interposed therebetween. In addition, the lower plate 32 includes a push pin 33. The push pin 33 pushes a lower die 12 toward the direction of an upper die 11 when press molding is performed, and is connected to a push mechanism (not illustrated).

Configuration of Die Set (First Embodiment)

The configuration of the die set 10 according to a first embodiment of this disclosure will be described with reference to FIGS. 1 to 4. As illustrated in FIG. 1, the die set 10 includes the upper die 11, the lower die 12, a side die 13, and a sleeve 14.

The upper die 11 has an upper molding surface 11*a* for molding a functional upper optical surface of the optical element. The upper die 11 includes a protrusion portion 111 having a cylindrical shape, and a distal end surface of the protrusion portion 111 forms the upper molding surface 11*a*. The upper die 11 is mounted on an upper end portion of the sleeve 14. The lower die 12 has a lower molding surface 12*a* for molding a functional lower optical surface of the optical element. The lower molding surface 12*a* is disposed in a through hole 133 of the side die 13. The side die 13 has a side molding surface 13*a* for forming a side surface of the optical element. The upper die 11 and the lower die 12 are disposed such that the molding surfaces of the upper die 11 and the lower die 12 face each other in a state where the side die 13 is interposed therebetween.

Figure 2:
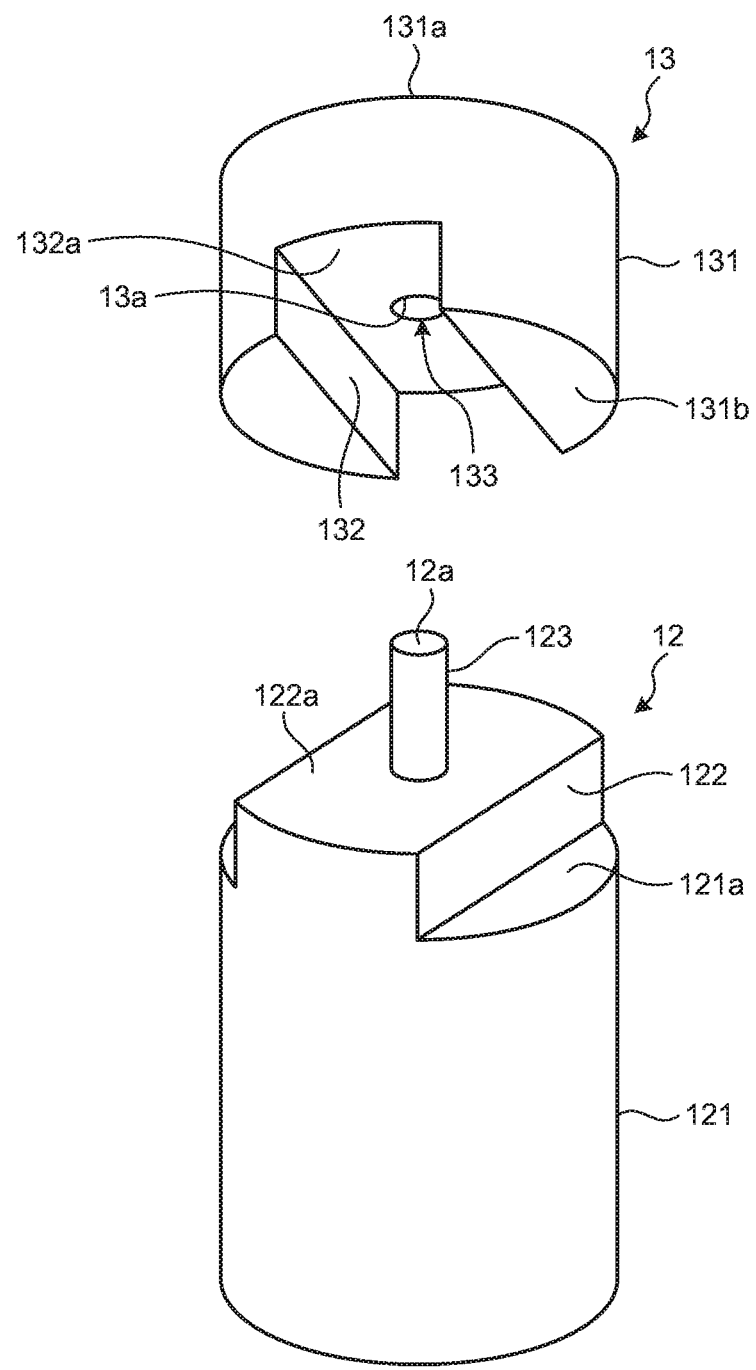
FIG. 2 is a perspective view illustrating a lower die and a side die of the optical element molding die according to the first embodiment of this disclosure, and is a view in which facing surfaces of the lower die and the side die can be seen.

Specifically, as illustrated in FIG. 2, the lower die 12 includes a main body portion 121 having a cylindrical shape, a protrusion portion 122 which protrudes from an upper surface 121*a* of the main body portion 121, and a protrusion portion 123 having a cylindrical shape which protrudes from an upper surface 122*a* of the protrusion portion 122. A distal end surface of the protrusion portion 123 forms the lower molding surface 12*a* of the lower die 12.

The lower die 12 is configured to be able to come into a state where the lower die 12 moves integrally with the side die 13 with respect to the upper die 11 in a state where the position of the lower molding surface 12*a* in the through hole 133 of the side die 13 is maintained at a predetermined position, and a state where the lower die 12 moves with respect to the upper die 11 such that the position of the lower molding surface 12*a* in the through hole 133 of the side die 13 reaches a position which is higher than the above-described predetermined position and in the vicinity of an upper surface 131*a* of the side die 13, which will be described later.

Specifically, the side die 13 includes a main body portion 131 having a cylindrical shape and a recess portion 132 with a predetermined depth which is formed in a lower surface 131*b* of the main body portion 131. The recess portion 132 is formed into a shape corresponding to that of the protrusion portion 122 of the lower die 12. In addition, a through hole 133 penetrating through the main body portion 131 is formed in a bottom surface 132*a* of the recess portion 132. An inner peripheral surface of the through hole 133 forms the side molding surface 13*a* of the side die 13. In addition, the through hole 133 is configured such that the protrusion portion 111 of the upper die 11 and the protrusion portion 123 of the lower die 12 which are described above can be inserted thereinto.

As illustrated in FIG. 2, stepped shapes which can be fitted into each other are formed in the facing surfaces of the lower die 12 and the side die 13, namely, in the upper surface 121*a* of the main body portion 121 of the lower die 12 and the lower surface 131*b* of the main body portion 131 of the side die 13. Specifically, the protrusion portion 122 is formed on the upper surface 121*a* of the lower die 12, and the recess portion 132 having the shape corresponding to that of the protrusion portion 122 is formed on the lower surface 131*b* of the side die 13.

Figure 3:
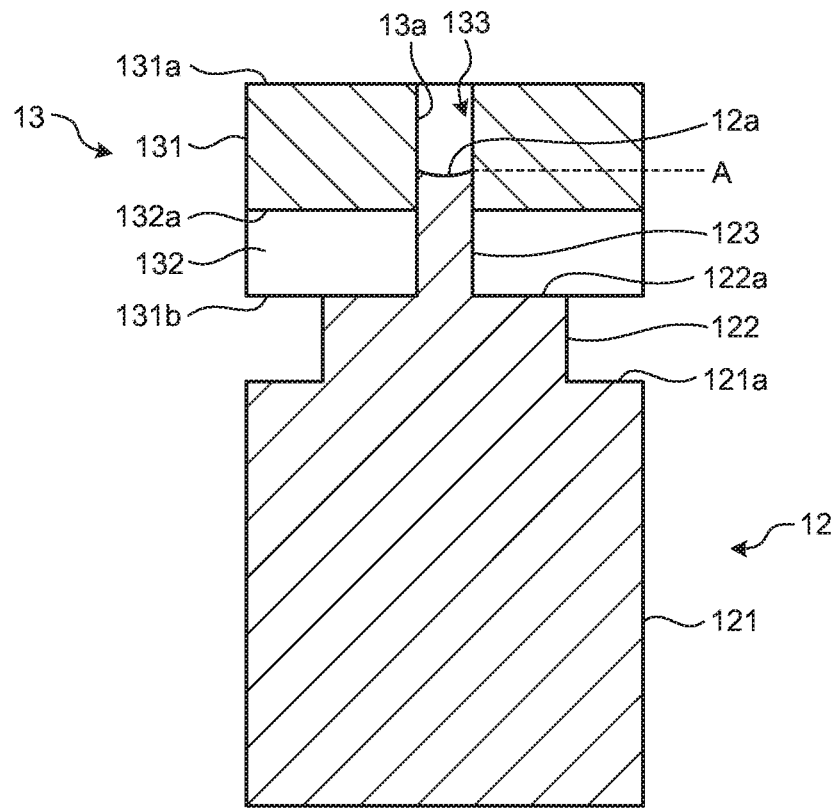
FIG. 3 is a cross-sectional view illustrating a state where in the lower die and the side die of the optical element molding die according to the first embodiment of this disclosure, a protrusion portion of the lower die is not fitted into a recess portion of the side die.

Therefore, as illustrated in FIG. 3, in a case where a portion of the surface in which the recess portion 132 is not formed in the side die 13 is in contact with the protrusion portion 122 of the lower die 12, namely, in a case where the lower surface 131*b* of the main body portion 131 of the side die 13 is in contact with the upper surface 122*a* of the protrusion portion 122 of the lower die 12, the lower die 12 comes into the state where the position of the lower molding surface 12*a* in the through hole 133 of the side die 13 is maintained at a predetermined position A. In a method of molding an optical element using the die set 10 which will be described later, a disposition step, a gas replacement step, a heating step, a press molding step, and a cooling step are performed in a state where the lower die 12 and the side die 13 are disposed as illustrated in the same drawing.

Figure 4:
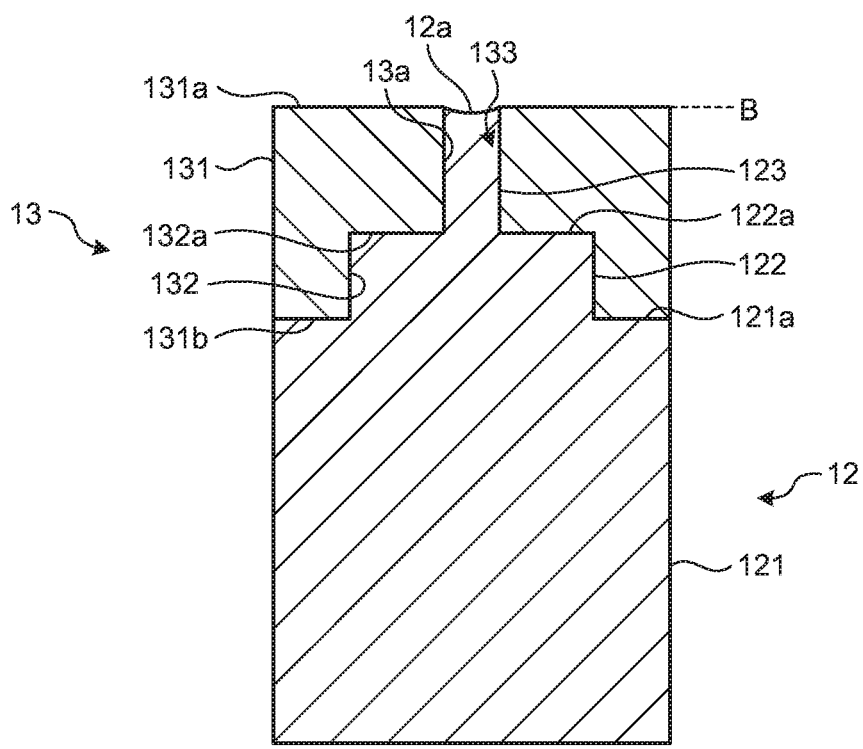
FIG. 4 is a cross-sectional view illustrating a state where in the lower die and the side die of the optical element molding die according to the first embodiment of this disclosure, the protrusion portion of the lower die is fitted into the recess portion of the side die.

On the other hand, as illustrated in FIG. 4, in a case where the recess portion 132 of the side die 13 is in contact with the protrusion portion 122 of the lower die 12, namely, in a case where the bottom surface 132*a* of the recess portion 132 of the side die 13 is in contact with the upper surface 122*a* of the protrusion portion 122 of the lower die 12, the lower die 12 comes into the state where the position of the lower molding surface 12*a* in the through hole 133 of the side die 13 reaches a position higher than the predetermined position A, namely, a position B in the vicinity of the upper surface 131*a* of the side die 13. In the method of molding an optical element using the die set 10 which will be described later, a push-up step and a take-out step are performed in a state where the lower die 12 and the side die 13 are disposed as illustrated in the same drawing.

Incidentally, "the state where the recess portion 132 of the side die 13 is in contact with the protrusion portion 122 of the lower die 12" includes also states other than the state illustrated in FIG. 4. Namely, in the same drawing, since the height of the protrusion portion 122 of the lower die 12 is the same as the depth of the recess portion 132 of the side die 13, the bottom surface 132*a* of the recess portion 132 of the side die 13 comes into a state of contact with the upper surface 122*a* of the protrusion portion 122 of the lower die 12, and the lower surface 131*b* of the main body portion 131 of the side die 13 comes into a state of contact with the upper surface 121*a* of the main body portion 121 of the lower die 12.

On the other hand, for example, in a case where the height of the protrusion portion 122 of the lower die 12 is larger than the depth of the recess portion 132 of the side die 13, the bottom surface 132*a* of the recess portion 132 of the side die 13 comes into a state of contact only with the upper surface 122*a* of the protrusion portion 122 of the lower die 12, but the lower surface 131*b* of the main body portion 131 of the side die 13 does not come into a state of contact with the upper surface 121*a* of the main body portion 121 of the lower die 12.

In addition, for example, in a case where the height of the protrusion portion 122 of the lower die 12 is smaller than the depth of the recess portion 132 of the side die 13, the lower surface 131*b* of the main body portion 131 of the side die 13 comes into a state of contact only with the upper surface 121*a* of the main body portion 121 of the lower die 12, but the bottom surface 132*a* of the recess portion 132 of the side die 13 does not come into a state of contact with the upper surface 122*a* of the protrusion portion 122 of the lower die 12. As described above, "the state where the recess portion 132 of the side die 13 is in contact with the protrusion portion 122 of the lower die 12" includes also a state where only either the upper surface 122a is in contact with the bottom surface 132a or the upper surface 121a is in contact with the lower surface 131b.

As illustrated in FIG. 1, the sleeve 14 is formed into a tubular shape, and a through hole 14a through which an inert gas is introduced into the die set 10 in the gas replacement step of the method of molding an optical element which is will be described later is formed in the sleeve 14.

Method of Molding an Optical element (First Embodiment)

Hereinafter, the method of molding an optical element using the die set 10 will be described with reference to FIG. 1 and FIGS. 5 to 7. In the method of molding an optical element according to this embodiment, the disposition step, the gas replacement step, the heating step, the press molding step, the cooling step, the push-up step, and the take-out step are performed in order.

Figure 5:
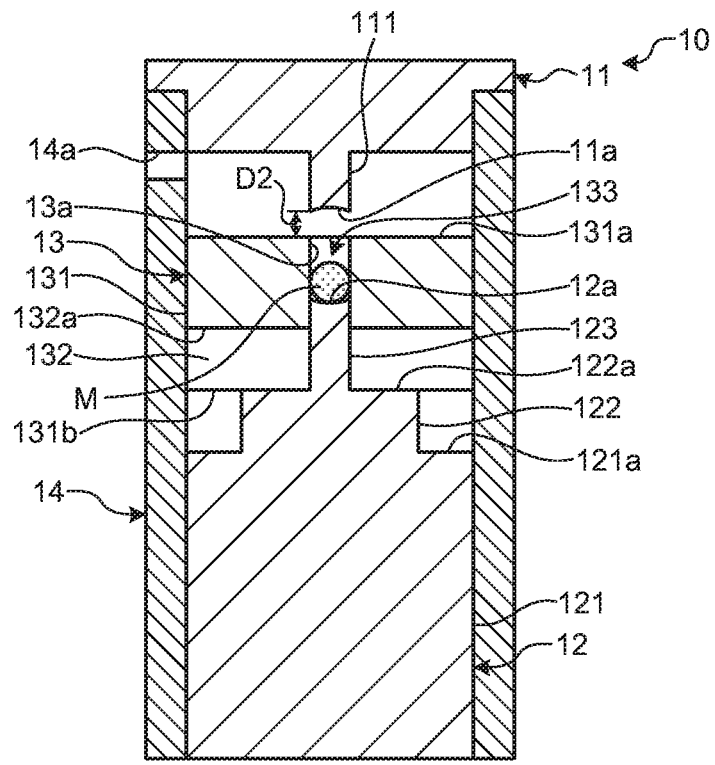
FIG. 5 is a cross-sectional view illustrating the mode of a disposition step in a method of molding an optical element using the optical element molding die according to the first embodiment of this disclosure.

In the disposition step, as illustrated in FIG. 5, the lower die 12 and the side die 13 are disposed inside the sleeve 14 such that similarly to FIG. 3 described above, the lower surface 131b of the main body portion 131 of the side die 13 is in contact with the upper surface 122a of the protrusion portion 122 of the lower die 12. In addition, the protrusion portion 123 of the lower die 12 is inserted into the through hole 133 of the side die 13 such that the lower molding surface 12a is positioned in the through hole 133 of the side die 13.

Subsequently, a mold material M having a regulated volume is disposed on the lower molding surface 12a of the lower die 12. The shape of the mold material M is not limited to a ball shape, and may be a circular disk shape or the shape of a lens that is processed into an approximately spherical shape in advance. Subsequently, the upper die 11 is mounted on an upper end surface of the sleeve 14. Incidentally, when the upper die 11 is mounted on the upper end surface of the sleeve 14, the height of each member of the die set 10 is adjusted such that a predetermined distance D2 is formed between the upper molding surface 11a of the upper die 11 and the upper surface 131a of the main body portion 131 of the side die 13.

In the gas replacement step, the die set 10 in which the upper die 11, the lower die 12, the side die 13, and the mold material M are disposed inside the sleeve 14 is transported to the gas replacement chamber 20 of the molding device 1 illustrated in FIG. 1. Then, the entire air of the gas replacement chamber 20 is replaced with an inert gas (for example, a nitrogen gas) in a state where, as illustrated in FIG. 5, the upper molding surface 11a of the upper die 11 is positioned out of the through hole 133 of the side die 13. Therefore, the nitrogen gas is introduced into the die set 10 from the through hole 14a of the sleeve 14, and air in the through hole 133 of the side die 13 in which the mold material M is disposed is replaced with the nitrogen gas.

Incidentally, in the gas replacement step, in order to make sure a reliable nitrogen replacement, the nitrogen replacement may be performed by filling the gas replacement chamber 20 with the nitrogen gas after depressurizing the gas replacement chamber 20 at atmospheric pressure using a vacuum pump (not illustrated) before the nitrogen replacement.

In addition, there is a possibility that in the gas replacement step, when the gas replacement chamber 20 is depressurized or filled with the nitrogen gas, the mold material M flies out of the through hole 133 of the side die 13 depending on the shape or the mass of the mold material M. Therefore, in order to prevent the mold material M from flying out thereof as described above, it is preferable that the distance D2 between the upper molding surface 11a of the upper die 11 and the upper surface 131a of the main body portion 131 of the side die 13 is smaller than the thickness of the mold material M.

In the heating step, the die set 10 after subjected to the nitrogen replacement is transported to the molding chamber 30 of the molding device 1 which is illustrated in FIG. 1. Then, the die set 10 transported to the molding chamber 30 is interposed between the upper plate 31 and the lower plate 32, and the die set 10 and the mold material M that is disposed in the through hole 133 of the side die 13 are heated to the yield point temperature of the mold material M or greater.

Figure 6:
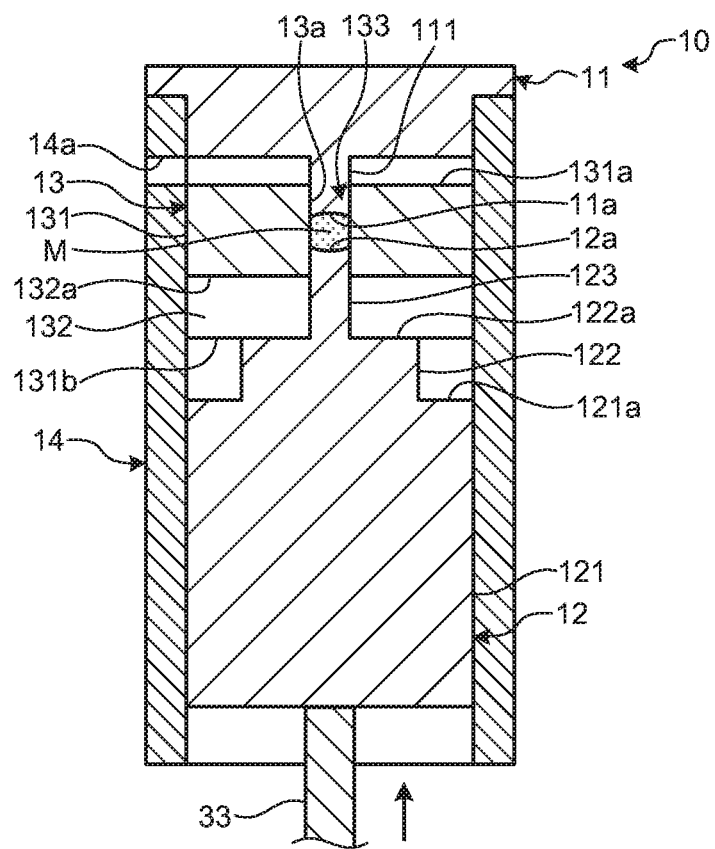
FIG. 6 is a cross-sectional view illustrating the mode of a press molding step in the method of molding an optical element using the optical element molding die according to the first embodiment of this disclosure.

In the press molding step, the push pin 33 (refer to FIG. 1) is raised by the push mechanism (not illustrated); and thereby, the side die 13 and the lower die 12 are raised. Specifically, the press molding step is performed, as illustrated in FIG. 6, in a state where the lower surface 131b of the main body portion 131 of the side die 13 is in contact with the upper surface 122a of the protrusion portion 122 of the lower die 12. Therefore, the side die 13 and the lower die 12 move integrally with respect to the upper die 11 in a state where the position of the lower molding surface 12a in the through hole 133 of the side die 13 is maintained at the predetermined position; and thereby, the mold material M is press molded with the upper die 11 and the lower die 12.

Namely, in the press molding step, the side die 13 and the lower die 12 are integrally raised inside the sleeve 14 in a state where the height of the lower molding surface 12a in the through hole 133 of the side die 13 is maintained. As described above, when the side die 13 and the lower die 12 are integrally raised, relatively, the upper molding surface 11a of the upper die 11 is inserted into the through hole 133 of the side die 13. Then, the mold material M is pressed in the through hole 133 to be molded into a lens shape by the upper molding surface 11a and the lower molding surface 12a.

In the cooling step, after the die set 10 is cooled to approximately 100° C., the die set 10 is transported out of the molding device 1. Then, the die set 10 outside the molding device 1 is further cooled close to a room temperature.

Figure 7:
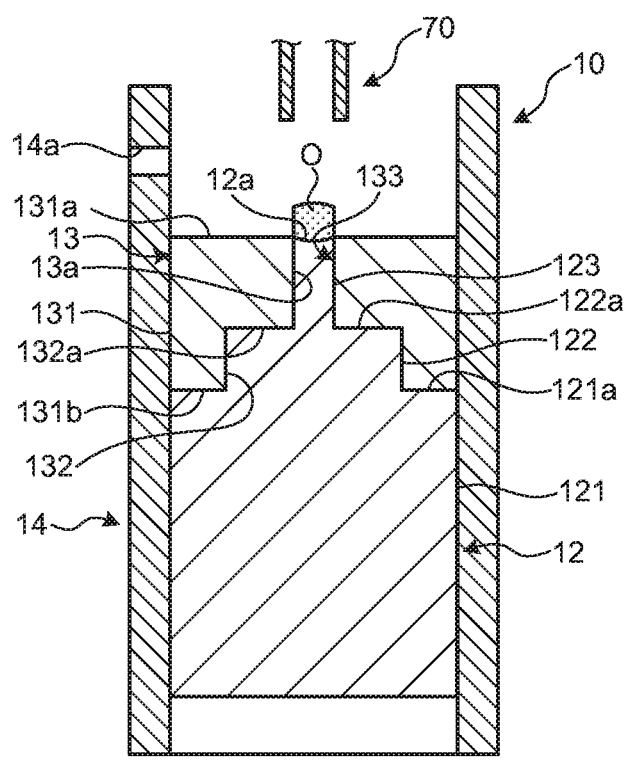
FIG. 7 is a cross-sectional view illustrating the mode of a push-up step and a take-out step in the method of molding an optical element using the optical element molding die according to the first embodiment of this disclosure.

In the push-up step, as illustrated in FIG. 7, firstly, the upper die 11 is removed from the die set 10. Subsequently, the lower molding surface 12a of the lower die 12 in the through hole 133 of the side die 13 moves to a position which is higher relative to the position in the press molding step and at which at least a part of the optical element O after molding protrudes from the upper surface 131a of the main body portion 131 of the side die 13.

In the push-up step, specifically, the orientation of the stepped shape of the side die 13 with respect to that of the stepped shape of the lower die 12 in the press molding step is switched to an orientation where the stepped shapes are fitted into each other; and thereby, the lower molding surface 12a moves in the through hole 133 of the side die 13. Incidentally, for example, for the case of the lower die 12, the above-described "orientation of the stepped shape" indicates the orientation of the boundary line between the upper surface 121a of the main body portion 121 and the protrusion portion 122, and for the case of the side die 13, the above-described "orientation of the stepped shape" indicates the orientation of the boundary line between the lower surface 131b of the main body portion 131 and the recess portion 132.

In the push-up step, more specifically, the orientation of the stepped shape of the side die 13 is aligned with that of the stepped shape of the lower die 12, for example, by rotating the side die 13 in the above-described state (refer to FIG. 6) in the press molding step by 90° around the axis of the through hole 133. Then, the bottom surface 132a of the recess portion 132 of the side die 13 comes into contact with the upper surface 122a of the protrusion portion 122 of the lower die 12, and the protrusion portion 122 and the recess portion 132 are fitted into each other. Therefore, the side die 13 is lowered with respect to the lower die 12, and the lower molding surface 12a is raised in the through hole 133 of the side die 13 relatively. Then, the optical element O is pushed upward out of the through hole 133.

Incidentally, in FIG. 7, the side die 13 is lowered and the protrusion portion 122 and the recess portion 132 are fitted into each other by rotating the side die 13 by 90° around the axis of the through hole 133 in a state where the lower die 12 is fixed; however, on the contrary, the lower die 12 may be raised and the protrusion portion 122 and the recess portion 132 may be fitted into each other by rotating the lower die 12 by 90° around the axis of the through hole 133 in a state where the side die 13 is fixed.

In the take-out step, as illustrated in FIG. 7, the optical element O which is pushed out of the through hole 133 of the side die 13 is taken out of the die set 10 by a suctioning tool 70.

As described above, according to the method of molding the optical element O using the die set 10, when the mold material M is molded, since press molding can be performed by integrally moving the side die 13 and the lower die 12 without moving the upper die 11, it is not necessary to independently drive the upper die 11, and it is possible to simplify the configuration of the molding device 1. In addition, according to the method of molding the optical element O, when the optical element O after molding is taken out from the die set 10, it is possible to push the optical element O out from the through hole 133 of the side die 13, and thus, also in a case where the optical element O with a very small diameter is molded, it is possible to easily take out the optical element O.

In addition, in the method of molding the optical element O, owing to the simple operation of switching the orientation of the stepped shape of the side die 13 with respect to that of the stepped shape of the lower die 12 to the orientation where the stepped shapes are fitted into each other, it is possible to easily switch the height of the lower molding surface 12a of the lower die 12 in the through hole 133 of the side die 13 between the position when the mold material M is press molded and the position when the optical element O after molding is taken out from the die set 10. Therefore, also in a case where the optical element O molded has a very small diameter so that the suctioning tool 70 cannot be inserted into the through hole 133 of the side die 13, it is possible to easily take out the optical element O from the die set 10 by using the suctioning tool 70 after pushing the optical element O out from the through hole 133 of the side die 13.

In addition, in the method of molding the optical element O, since the upper molding surface 11a of the upper die 11 is positioned above the upper surface 131a of the main body portion 131 of the side die 13 when nitrogen replacement is performed (refer to FIG. 5), it is possible to perform the nitrogen replacement in a state where the through hole 133 of the side die 13 is released. Therefore, also when the nitrogen replacement is performed, it is not necessary to independently drive the upper die 11, and it is possible to simplify the configuration of the molding device 1.

Configuration of Die Set (Modification Example of First Embodiment)

The configuration of a die set according to a modification example of the first embodiment of this disclosure will be described with reference to FIGS. 8 to 10. Incidentally, except for a lower die 12A and a side die 13A, the configuration of the die set according to this modification example is same as that of the die set 10 (refer to FIG. 5) described above. Therefore, hereinafter, the illustration and description of the configuration other than the lower die 12A and the side die 13A will be omitted. In addition, in a case where the optical element O is molded using the die set according to this modification example, similarly to the case of the die set 10, the molding device 1 (refer to FIG. 1) described above is used.

Figure 8:
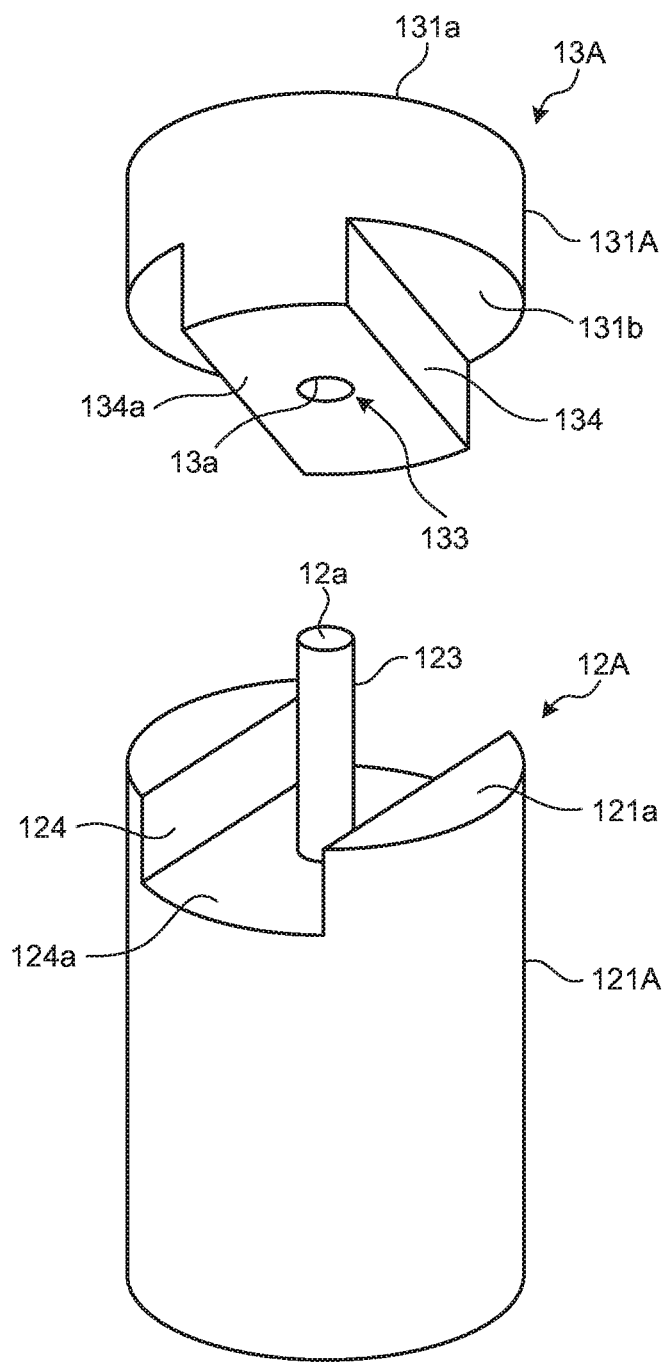
FIG. 8 is a perspective view illustrating a lower die and a side die of an optical element molding die according to a modification example of the first embodiment of this disclosure, and is a view in which facing surfaces of the lower die and the side die can be seen.

As illustrated in FIG. 8, the lower die 12A includes a main body portion 121A having a cylindrical shape, a recess portion 124 with a predetermined depth which is formed in the upper surface 121a of the main body portion 121A, and the protrusion portion 123 having a cylindrical shape which protrudes from a bottom surface 124a of the recess portion 124. The distal end surface of the protrusion portion 123 forms the lower molding surface 12a of the lower die 12A.

The side die 13A includes a main body portion 131A having a cylindrical shape and a protrusion portion 134 that protrudes from the lower surface 131b of the main body portion 131A. The protrusion portion 134 is formed into a shape corresponding to that of the recess portion 124 of the lower die 12A. In addition, the through hole 133 penetrating through the protrusion portion 134 and the main body portion 131A is formed in a lower surface 134a of the protrusion portion 134. The inner peripheral surface of the through hole 133 forms the side molding surface 13a of the side die 13A.

As described above, the stepped shapes of the lower die 12A and the side die 13A are reversed compared to those of the lower die 12 and the side die 13 of the die set 10 described above. Specifically, the recess portion 124 is formed in the upper surface 121a of the lower die 12A, and the protrusion portion 134 having a shape corresponding to that of the recess portion 124 is formed on the lower surface 131b of the side die 13A.

Figure 9:
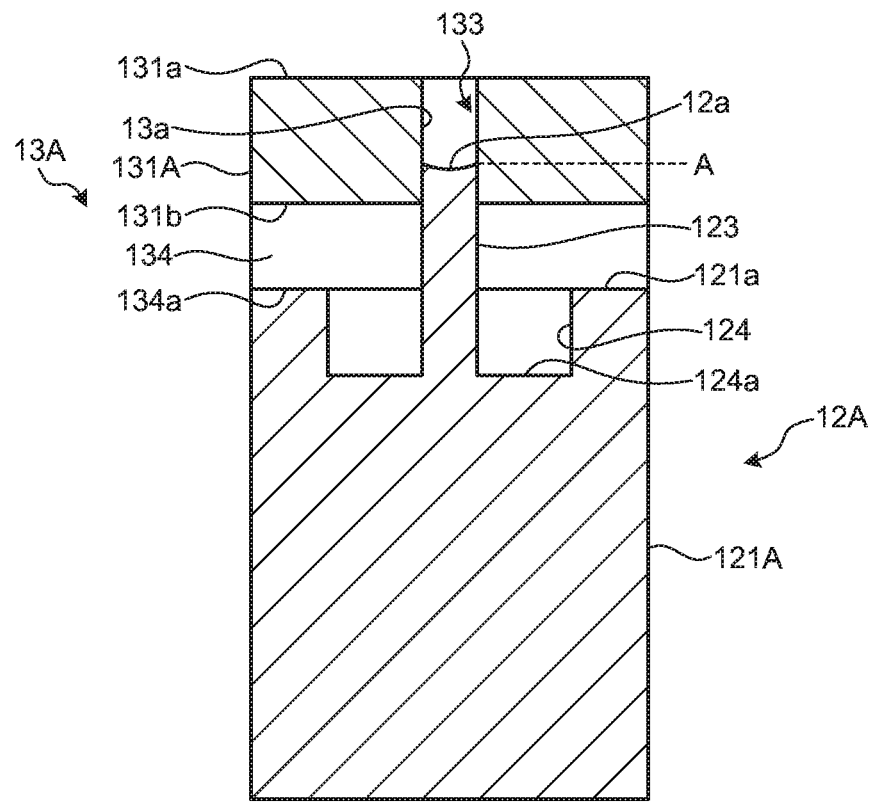
FIG. 9 is a cross-sectional view illustrating a state where in the lower die and the side die of the optical element molding die according to the modification example of the first embodiment of this disclosure, a protrusion portion of the side die is not fitted into a recess portion of the lower die.

Therefore, as illustrated in FIG. 9, in a case where the lower surface 134a of the protrusion portion 134 of the side die 13A is in contact with the upper surface 121a of the main body portion 121A of the lower die 12A, the lower die 12A comes into a state where the position of the lower molding surface 12a in the through hole 133 of the side die 13A is maintained at the predetermined position A. In a method of molding the optical element O using the die set according to this modification example, the disposition step, the gas replacement step, the heating step, the press molding step, and the cooling step are performed in a state where the lower die 12A and the side die 13A are disposed as illustrated in the same drawing.

Figure 10:
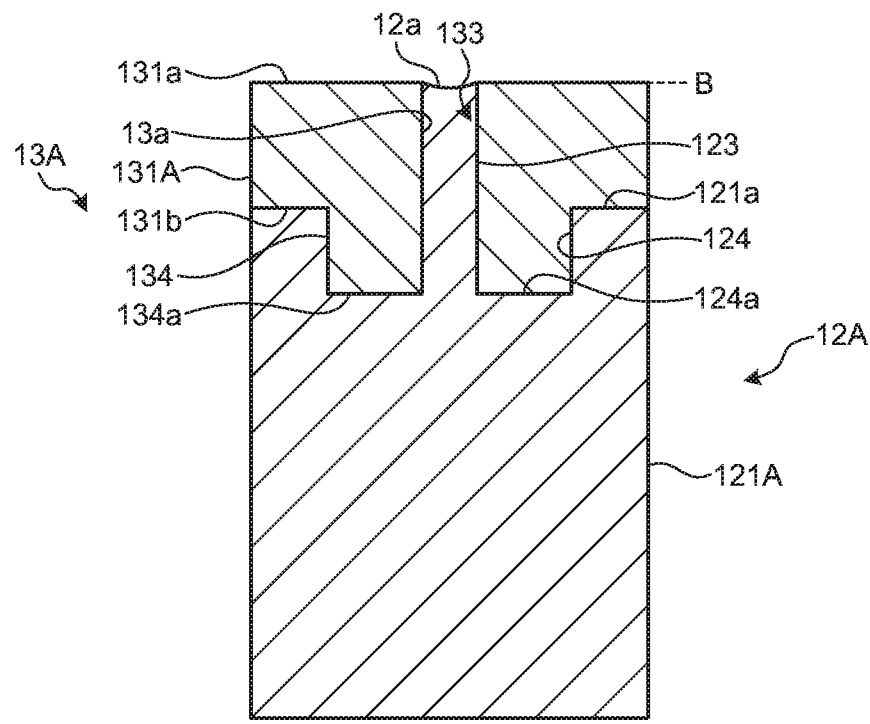
FIG. 10 is a cross-sectional view illustrating a state where in the lower die and the side die of the optical element molding die according to the modification example of the first embodiment of this disclosure, the protrusion portion of the side die is fitted into the recess portion of the lower die.

On the other hand, as illustrated in FIG. 10, in a case where the lower surface 134a of the protrusion portion 134 of the side die 13A is in contact with the bottom surface 124a of the recess portion 124 of the lower die 12A, the lower die 12A comes into a state where the position of the lower molding surface 12a in the through hole 133 of the side die 13A reaches a position higher than the predetermined position A, namely, the position B in the vicinity of the upper surface 131a of the side die 13A. In the method of molding the optical element O using the die set according to this modification example, the push-up step and the take-out step are performed in a state where the lower die 12A and the side die 13A are disposed as illustrated in the same drawing.

Since the die set with the above-described configuration according to this modification example is used in molding the optical element O, similarly to the die set 10 described above, it is possible to perform press molding by integrally moving the side die 13A and the lower die 12A; and thereby, it is possible to simplify the configuration of the molding device 1. In addition, similarly to the die set 10 described above, it is possible to push out the optical element O after molding from the through hole 133 of the side die 13A, and thus, also in a case where the optical element O with a very small diameter is molded, it is possible to easily take out the optical element O.

Configuration of Die Set (Second Embodiment)

Figure 11:
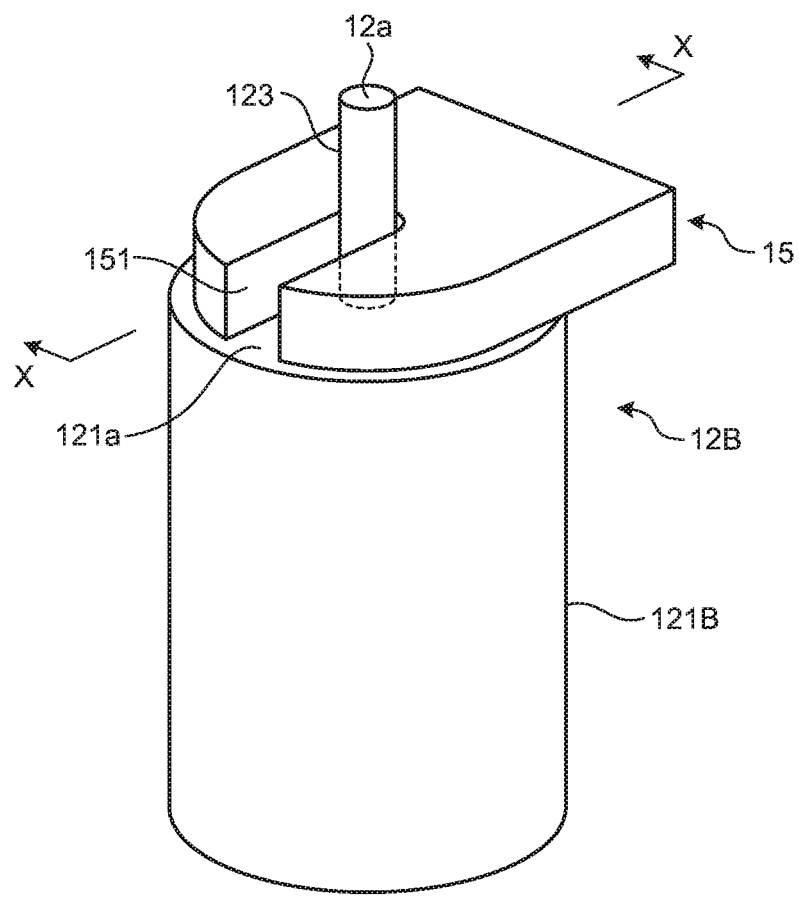
FIG. 11 is a perspective view illustrating the configuration of a lower die and a side die of an optical element molding die according to a second embodiment of this disclosure.
Figure 12:
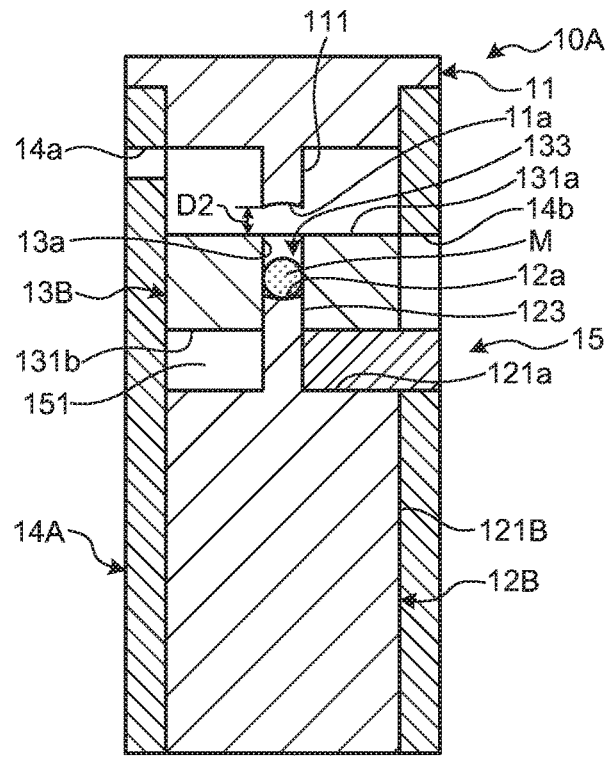
FIG. 12 is a cross-sectional view illustrating the mode of the disposition step in a method of molding an optical element using the optical element molding die according to the second embodiment of this disclosure.

The configuration of a die set 10A according to a second embodiment of this disclosure will be described with reference to FIGS. 11 to 14. Incidentally, FIG. 12 illustrates the cross-sectional shape of the die set 10A as cut along a direction X-X illustrated in FIG. 11. As illustrated in FIGS. 11 and 12, the die set 10A includes the upper die 11, a lower die 12B, a side die 13B, a sleeve 14A, and a spacer 15.

As illustrated in FIG. 11, the lower die 12B includes a main body portion 121B having a cylindrical shape and the protrusion portion 123 having a cylindrical shape which protrudes from the upper surface 121a of the main body portion 121B. The distal end surface of the protrusion portion 123 forms the lower molding surface 12a of the lower die 12B.

As illustrated in FIG. 12, the side die 13B is formed into a tubular shape, and the through hole 133 is formed at the center of the side die 13B. The inner peripheral surface of the through hole 133 forms the side molding surface 13a of the side die 13B. In addition, the through hole 133 is configured such that the protrusion portion 111 of the upper die 11 and the protrusion portion 123 of the lower die 12B can be inserted thereinto.

The sleeve 14A is formed into a tubular shape. The through hole 14a through which an inert gas is introduced into the die set 10A in the gas replacement step of a method of molding the optical element O which will be described later, and a through hole 14b through which the spacer 15 is inserted into the sleeve 14A are formed in the sleeve 14A.

Overall, the spacer 15 is formed into a U shape, and a notch 151 having such a width that the protrusion portion 123 of the lower die 12B can be fitted into the notch 151 is formed in the spacer 15. The spacer 15 is inserted into the sleeve 14A through the through hole 14b of the sleeve 14A, and is detachably disposed between the side die 13B and the lower die 12B.

Figure 13:
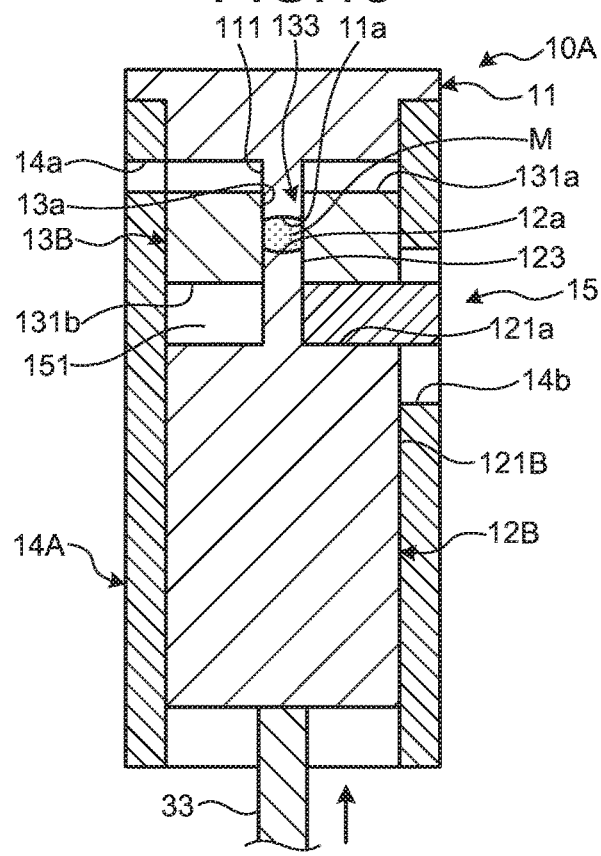
FIG. 13 is a cross-sectional view illustrating the mode of the press molding step in the method of molding an optical element using the optical element molding die according to the second embodiment of this disclosure.

Here, in a case where the spacer 15 is installed between the side die 13B and the lower die 12B, as illustrated in FIGS. 12 and 13, the lower die 12B comes into a state where the position of the lower molding surface 12a of the lower die 12B in the through hole 133 of the side die 13B is maintained at a predetermined position. In the method of molding the optical element O using the die set 10A which will be described later, the disposition step, the gas replacement step, the heating step, the press molding step, and the cooling step are performed in a state where the spacer 15 is installed as illustrated in the same drawings.

Figure 14:
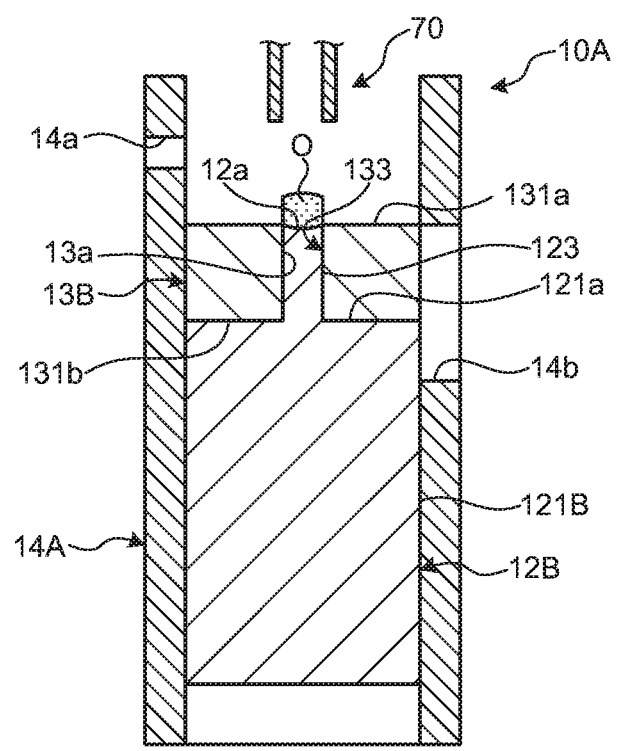
FIG. 14 is a cross-sectional view illustrating the mode of the push-up step and the take-out step in the method of molding an optical element using the optical element molding die according to the second embodiment of this disclosure.

On the other hand, in a case where the spacer 15 is not installed between the side die 13B and the lower die 12B, as illustrated in FIG. 14, the lower die 12B comes into a state where the position of the lower molding surface 12a of the lower die 12B in the through hole 133 of the side die 13B reaches a position higher than the above-described predetermined position, namely, a position in the vicinity of the upper surface 131a of the side die 13B. In the method of molding the optical element O using the die set 10A which will be described later, the push-up step and the take-out step are performed in a state where the spacer 15 is not installed as illustrated in the same drawing.

Method of Molding an Optical Element (Second Embodiment)

Hereinafter, the method of molding the optical element O using the die set 10A will be described with reference to FIGS. 12 to 14. In the method of molding the optical element O according to this embodiment, the disposition step, the gas replacement step, the heating step, the press molding step, the cooling step, the push-up step, and the take-out step are performed in order. Incidentally, among the above-described steps, the gas replacement step, the heating step, the cooling step, and the take-out step are the same as those in the method of molding the optical element O according to the first embodiment, and thus, the description thereof will be omitted. In addition, similarly to the first embodiment, the method of molding the optical element O according to this embodiment is performed using the molding device 1 (refer to FIG. 1).

In the disposition step, as illustrated in FIG. 12, the spacer 15 is installed between the side die 13B and the lower die 12B. Then, the protrusion portion 123 of the lower die 12B is inserted into the through hole 133 of the side die 13B such that the lower molding surface 12a is positioned in the through hole 133 of the side die 13B.

Subsequently, the mold material M having a regulated volume is disposed on the lower molding surface 12a of the lower die 12B. The shape of the mold material M is not limited to a ball shape, and may be a circular disk shape or the shape of a lens that is processed into an approximately spherical shape in advance. Subsequently, the upper die 11 is mounted on an upper end surface of the sleeve 14A. Incidentally, when the upper die 11 is mounted on the upper end surface of the sleeve 14A, the height of each member of the die set 10A is adjusted such that the predetermined distance D2 is formed between the upper molding surface 11a of the upper die 11 and the upper surface 131a of the side die 13B.

In the press molding step, the push pin 33 (refer to FIG. 1) is raised by the push mechanism (not illustrated); and thereby, the side die 13B, the spacer 15, and the lower die 12B are raised. Specifically, the press molding step is performed in a state where, as illustrated in FIG. 13, the spacer 15 is installed between the side die 13B and the lower die 12B. Therefore, the side die 13B, the spacer 15, and the lower die 12B move integrally with respect to the upper die 11 in a state where the position of the lower molding surface 12a in the through hole 133 of the side die 13B is maintained at the predetermined position; and thereby, the mold material M is press molded with the upper die 11 and the lower die 12B.

Namely, in the press molding step, the side die 13B, the spacer 15, and the lower die 12B are integrally raised inside the sleeve 14A in a state where the height of the lower molding surface 12a in the through hole 133 of the side die 13B is maintained. As described above, when the side die 13B, the spacer 15, and the lower die 12B are integrally raised, relatively, the upper molding surface 11a of the upper die 11 is inserted into the through hole 133 of the side die 13B. Then, the mold material M is pressed in the through hole 133 to be molded into a lens shape by the upper molding surface 11a and the lower molding surface 12a.

In the push-up step, as illustrated in FIG. 14, firstly, the upper die 11 is removed from the die set 10A. Subsequently, the spacer 15 installed between the side die 13B and the lower die 12B is removed; and thereby, the lower molding surface 12a of the lower die 12B in the through hole 133 of the side die 13B moves to a position which is higher relative to the position in the press molding step and at which at least a part of the optical element O after molding protrudes from the upper surface 131a of the side die 13B.

Namely, in the push-up step, the spacer 15 which is installed in the press molding step is removed; and thereby, the side die 13B is lowered by the height of the spacer 15 with respect to the lower die 12B, and relatively, the lower molding surface 12a is raised in the through hole 133 of the side die 13B. Then, the optical element O is pushed upward out of the through hole 133. Incidentally, when the spacer 15 is removed, the removal is preferably performed while the side die 13B is pushed.

As described above, according to the method of molding the optical element O using the die set 10A, similarly to the first embodiment, it is possible to perform press molding by integrally moving the side die 13B and the lower die 12B; and thereby, it is possible to simplify the configuration of the molding device 1. In addition, similarly to the first embodiment, it is possible to push out the optical element O after molding from the through hole 133 of the side die 13B, and thus, also in a case where the optical element O with a very small diameter is molded, it is possible to easily take out the optical element O.

In addition, in the method of molding the optical element O, owing to the simple operation of attaching and detaching the spacer 15 that is disposed between the side die 13B and the lower die 12B, it is possible to easily switch the height of the lower molding surface 12a of the lower die 12B in the through hole 133 of the side die 13B between the position when the mold material M is press molded and the position when the optical element O after molding is taken out from the die set 10A. Therefore, also in a case where the optical element O with a very small diameter is molded, it is possible to easily take out the optical element O by using the suctioning tool 70 after pushing the optical element O out from the through hole 133 of the side die 13B.

Configuration of Die Set (Modification Example of Second Embodiment)

The configuration of a die set according to a modification example of the second embodiment of this disclosure will be described with reference to FIG. 15. Incidentally, except for a spacer 15A, the configuration of the die set according to this modification example is same as that of the die set 10A (refer to FIG. 12) described above. Therefore, hereinafter, the illustration and description of the configuration other than the spacer 15A will be omitted. In addition, in a case where the optical element O is molded using the die set according to this modification example, similarly to the case of the die set 10A, the molding device 1 (refer to FIG. 1) described above is used.

Figure 15:
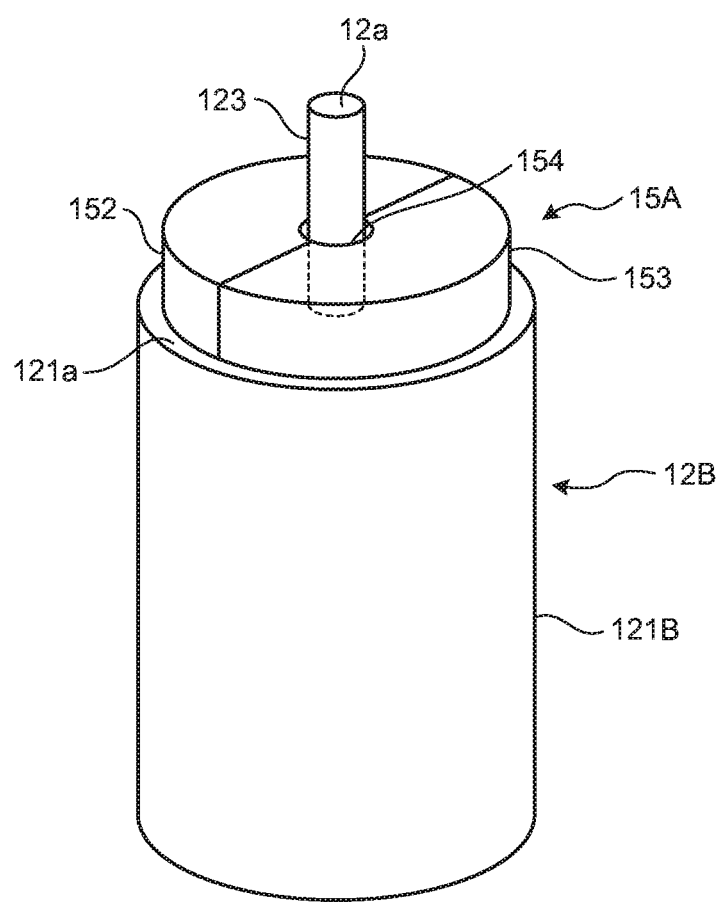
FIG. 15 is a perspective view illustrating the configuration of the lower die and the side die of an optical element molding die according to a modification example of the second embodiment of this disclosure.

As illustrated in FIG. 15, the spacer 15A is formed of two spacer pieces 152 and 153, each of which has a semicircular arc shape, and a through hole 154 is formed by assembling together the spacer pieces 152 and 153. Similarly to the spacer 15 described above, the spacer 15A is detachably disposed between the side die 13B and the lower die 12B.

In a case where the optical element O is molded using the die set according to this modification example, the steps up to the press molding step are performed similarly to the second embodiment. Then, subsequently, in the push-up step, the spacer 15A is removed by raising the lower die 12B until the spacer 15A is pushed out above the sleeve 14A; and thereby, the side die 13B is lowered by the height of the spacer 15A with respect to the lower die 12B. Therefore, relatively, the lower molding surface 12a is raised in the through hole 133 of the side die 13B; and thereby, the optical element O is pushed upward out of the through hole 133.

Since the die set with the above-described configuration according to this modification example is used in molding the optical element O, similarly to the die set 10A described above, it is possible to perform press molding by integrally moving the side die 13B and the lower die 12B; and thereby, it is possible to simplify the configuration of the molding device 1. In addition, similarly to the die set 10A described above, it is possible to push out the optical element O after molding from the through hole 133 of the side die 13B, and thus, also in a case where the optical element O with a very small diameter is molded, it is possible to easily take out the optical element O.

Configuration of Die Set (Third Embodiment)

Figure 17:
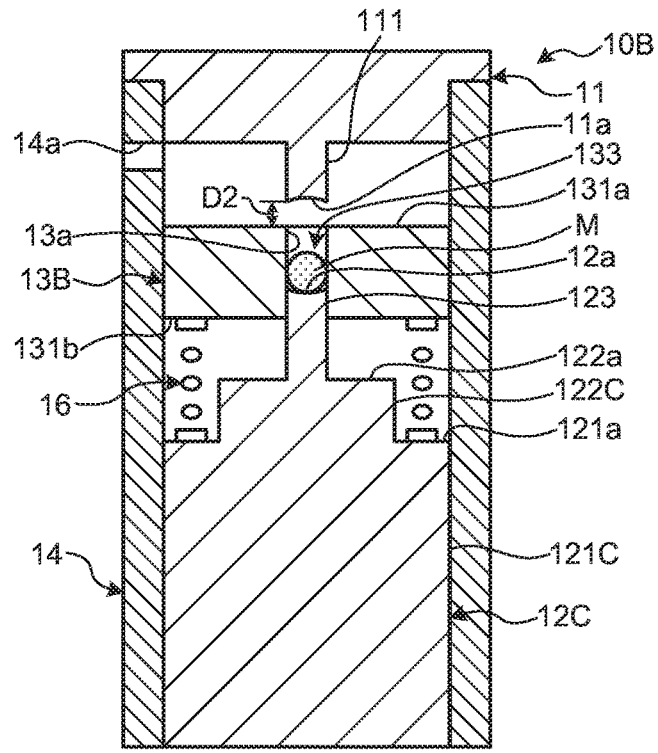
FIG. 17 is a cross-sectional view illustrating the mode of the disposition step in a method of molding an optical element using the optical element molding die according to the third embodiment of this disclosure.

The configuration of a die set 10B according to a third embodiment of this disclosure will be described with reference to FIGS. 16 to 19. As illustrated in FIGS. 16 and 17, the die set 10B includes the upper die 11, a lower die 12C, the side die 13B, the sleeve 14, and an elastic member 16. Incidentally, except for the lower die 12C and the elastic member 16, the configuration of the die set 10B is same as those of the die sets 10 and 10A (refer to FIGS. 5 and 12) described above. Therefore, hereinafter, the illustration and description of the configuration other than the lower die 12C and the elastic member 16 will be omitted.

As illustrated in FIG. 16, the lower die 12C includes a main body portion 121C having a cylindrical shape, a protrusion portion 122C having a cylindrical shape which protrudes from the upper surface 121a of the main body portion 121C, and the protrusion portion 123 having a cylindrical shape which protrudes from the upper surface 122a of the protrusion portion 122C. The distal end surface of the protrusion portion 123 forms the lower molding surface 12a of the lower die 12C.

The elastic member 16 is a coil spring. As illustrated in FIG. 17, the elastic member 16 is disposed between the side die 13B and the lower die 12C.

Figure 18:
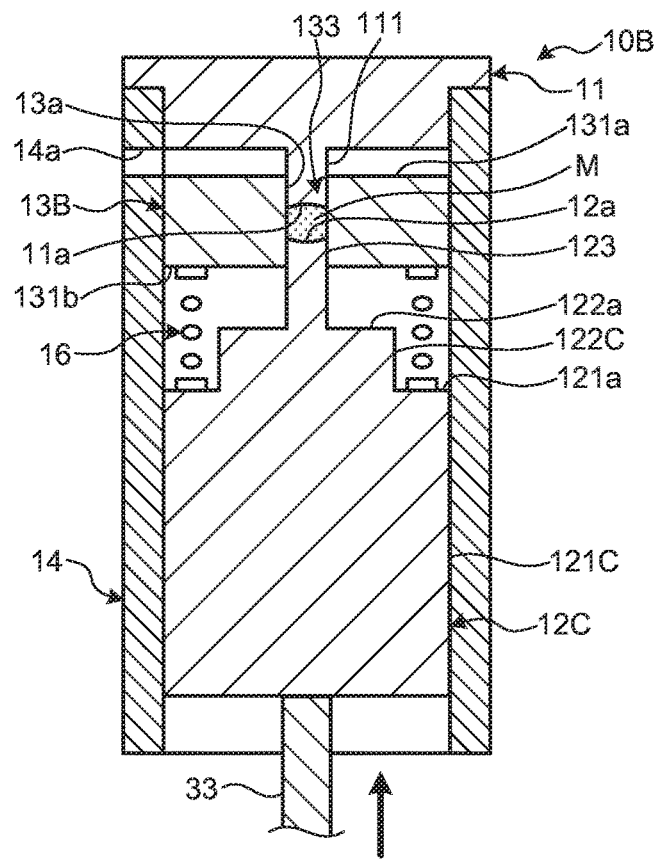
FIG. 18 is a cross-sectional view illustrating the mode of the press molding step in the method of molding an optical element using the optical element molding die according to the third embodiment of this disclosure.

Here, in a case where the side die 13B is pushed upward via the elastic member 16, as illustrated in FIGS. 17 and 18, the lower die 12C comes into a state where the position of the lower molding surface 12a of the lower die 12C in the through hole 133 of the side die 13B is maintained at the above-described predetermined position. In a method of molding the optical element O using the die set 10B which will be described later, the disposition step, the gas replacement step, the heating step, the press molding step, and the cooling step are performed in a state where the side die 13B is pushed upward via the elastic member 16 as illustrated in the same drawings.

Figure 19:
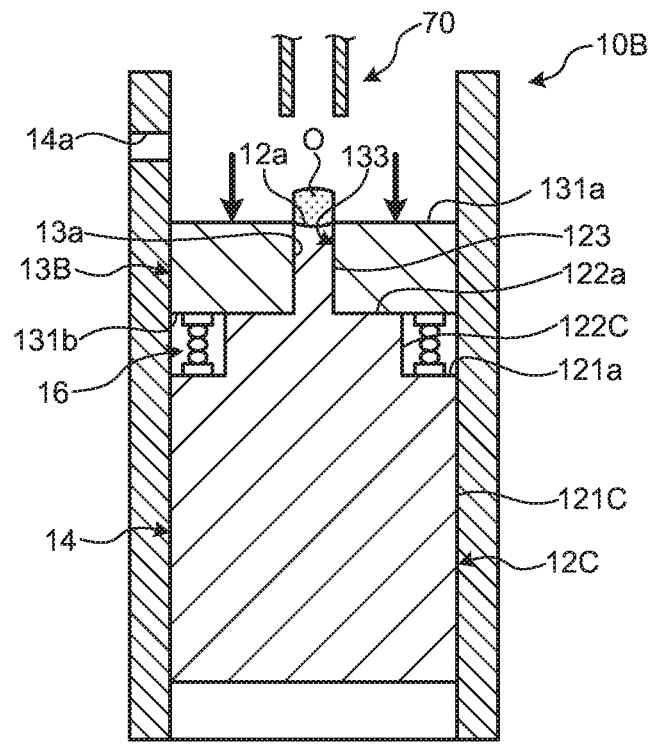
FIG. 19 is a cross-sectional view illustrating the mode of the push-up step and the take-out step in the method of molding an optical element using the optical element molding die according to the third embodiment of this disclosure.
Figure 20:
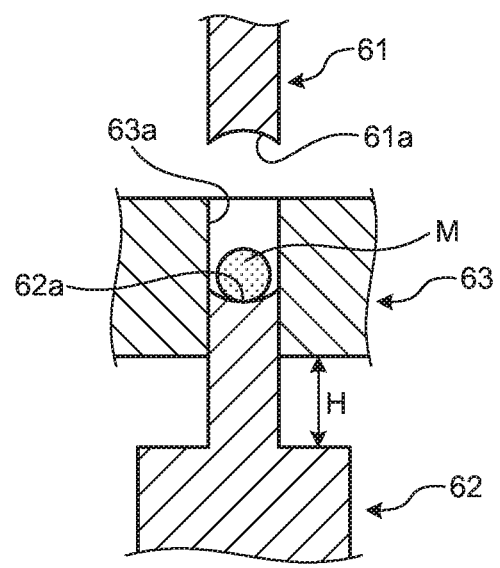
FIG. 20 is a cross-sectional view illustrating the mode of a disposition step in a method of molding an optical element using an optical element molding die according to the related art.
Figure 21:
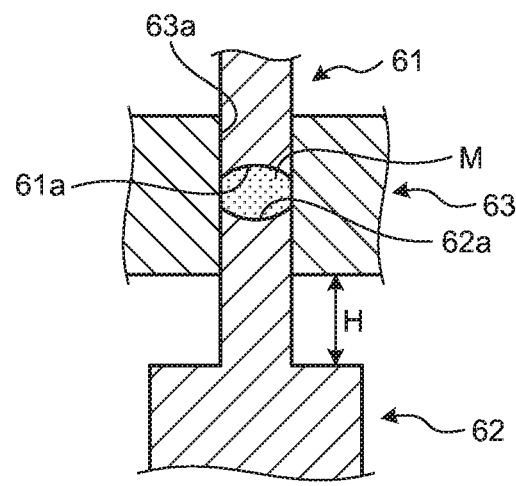
FIG. 21 is a cross-sectional view illustrating the mode of a press molding step in the method of molding an optical element using the optical element molding die according to the related art.
Figure 22:
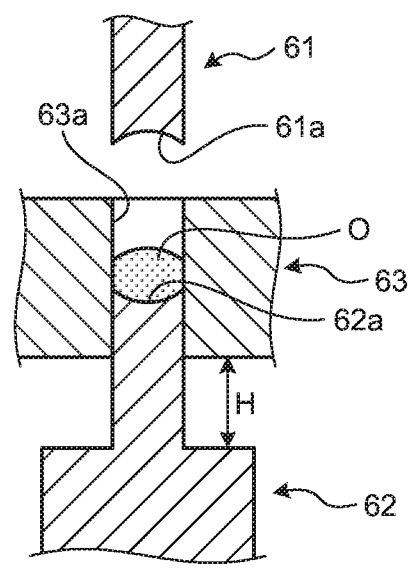
FIG. 22 is a cross-sectional view illustrating a mode where an upper die is raised after the press molding step in the method of molding an optical element using the optical element molding die according to the related art.
Figure 23:
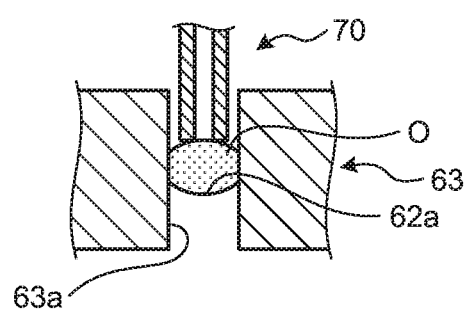
FIG. 23 is a cross-sectional view illustrating the mode of a take-out step in the method of molding an optical element using the optical element molding die according to the related art.
Figure 24:
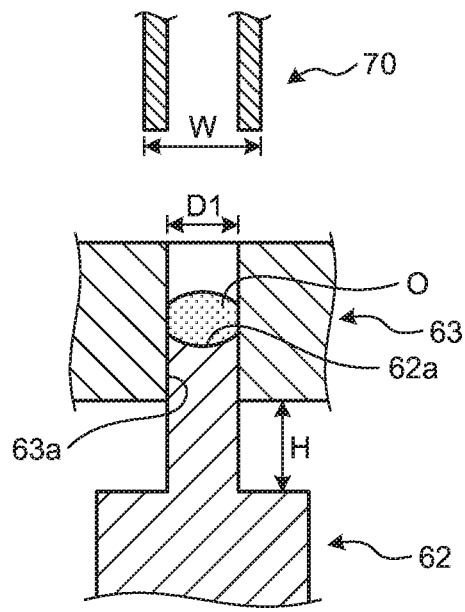
FIG. 24 is a cross-sectional view illustrating an example of the diameter of an optical element after molding and the width of a suctioning tool in the method of molding an optical element using the optical element molding die according to the related art.
Figure 25:
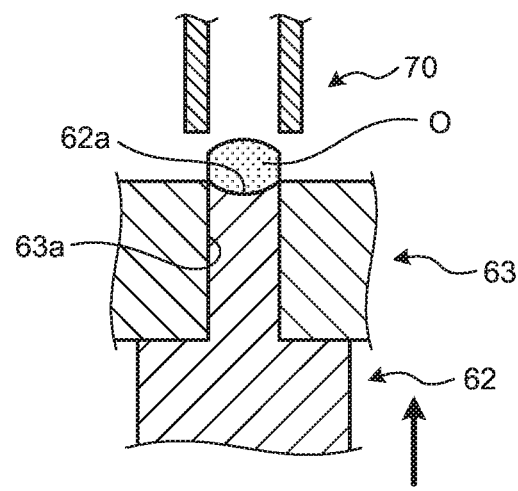
FIG. 25 is a cross-sectional view illustrating the mode of a push-up step and a take-out step in the method of molding an optical element using the optical element molding die according to the related art.

On the other hand, in a case where the elastic member 16 is compressed, as illustrated in FIG. 19, the lower die 12C comes into a state where the position of the lower molding surface 12a of the lower die 12C in the through hole 133 of the side die 13B reaches a position higher than the above-described predetermined position, namely, a position in the vicinity of the upper surface 131a of the side die 13B. In the method of molding the optical element O using the die set 10B which will be described later, the push-up step and the take-out step are performed in a state where the elastic member 16 is compressed as illustrated in the same drawing.

Method of Molding an Optical Element (Third Embodiment)

Hereinafter, the method of molding the optical element O using the die set 10B will be described with reference to FIGS. 17 to 19. In the method of molding the optical element O according to this embodiment, the disposition step, the gas replacement step, the heating step, the press molding step, the cooling step, the push-up step, and the take-out step are performed in order. Incidentally, among the above-described steps, the gas replacement step, the heating step, the cooling step, and the take-out step are the same as those in the method of molding the optical element O according to the first embodiment, and thus, the description thereof will be omitted. In addition, similarly to the first embodiment, the method of molding the optical element O according to this embodiment is performed using the molding device 1 (refer to FIG. 1).

In the disposition step, as illustrated in FIG. 17, the elastic member 16 is disposed between the side die 13B and the lower die 12C. Then, the protrusion portion 123 of the lower die 12C is inserted into the through hole 133 of the side die 13B such that the lower molding surface 12a is positioned in the through hole 133 of the side die 13B. Namely, the elastic member 16 is designed in advance such that the elastic member 16 disposed on the lower die 12C comes into a state of compression due to the weight of the side die 13B, but at the time, the lower molding surface 12a of the lower die 12C is positioned in the through hole 133.

Subsequently, the mold material M having a regulated volume is disposed on the lower molding surface 12a of the lower die 12C. The shape of the mold material M is not limited to a ball shape, and may be a circular disk shape or the shape of a lens that is processed into an approximately spherical shape in advance. Subsequently, the upper die 11 is mounted on an upper end surface of the sleeve 14. Incidentally, when the upper die 11 is mounted on the upper end surface of the sleeve 14, the height of each member of the die set 10B is adjusted such that the predetermined distance D2 is formed between the upper molding surface 11a of the upper die 11 and the upper surface 131a of the side die 13B.

In the press molding step, the push pin 33 (refer to FIG. 1) is raised by the push mechanism (not illustrated); and thereby, the side die 13B, the elastic member 16, and the lower die 12C are raised. Specifically, the press molding step is performed in a state where, as illustrated in FIG. 18, the elastic member 16 is disposed between the side die 13B and the lower die 12C. Therefore, the side die 13B, the elastic member 16, and the lower die 12C move integrally with respect to the upper die 11 in a state where the position of the lower molding surface 12a in the through hole 133 of the side die 13B is maintained at the predetermined position; and thereby, the mold material M is press molded with the upper die 11 and the lower die 12C.

Namely, in the press molding step, the side die 13B is pushed upward via the elastic member 16 by the lower die 12C; and thereby, the side die 13B, the elastic member 16, and the lower die 12C move integrally in the sleeve 14 in a state where a predetermined gap is formed between the side die 13B and the lower die 12C due to the elastic force of the elastic member 16 and the height of the lower molding surface 12a in the through hole 133 of the side die 13B is maintained. As described above, when the side die 13B, the elastic member 16, and the lower die 12C are integrally raised, relatively, the upper molding surface 11a of the upper die 11 is inserted into the through hole 133 of the side die 13B. Then, the mold material M is pressed in the through hole 133 to be molded into a lens shape by the upper molding surface 11a and the lower molding surface 12a.

In the push-up step, as illustrated in FIG. 19, firstly, the upper die 11 is removed from the die set 10B. Subsequently, the side die 13B is pushed downward to compress the elastic member 16; and thereby, the lower molding surface 12a of the lower die 12C in the through hole 133 of the side die 13B moves to a position which is higher relative to the position in the press molding step and at which a part of the optical element O after molding protrudes from the upper surface 131a of the side die 13B.

Namely, in the push-up step, the elastic member 16 below the side die 13B is compressed; and thereby, the side die 13B is lowered by the amount of compression of the elastic member 16 with respect to the lower die 12C, and relatively, the lower molding surface 12a is raised in the through hole 133 of the side die 13B. Then, the optical element O is pushed upward out of the through hole 133.

As described above, according to the method of molding the optical element O using the die set 10B, similarly to the first and second embodiments, it is possible to perform press molding by integrally moving the side die 13B and the lower die 12C; and thereby, it is possible to simplify the configuration of the molding device 1. In addition, similarly to the first and second embodiments, it is possible to push out the optical element O after molding from the through hole 133 of the side die 13B, and thus, also in a case where the optical element O with a very small diameter is molded, it is possible to easily take out the optical element O.

In addition, in the method of molding the optical element O, owing to the simple operation of stretching and compressing the elastic member 16 that is disposed between the side die 13B and the lower die 12C, it is possible to easily switch the height of the lower molding surface 12a of the lower die 12C in the through hole 133 of the side die 13B between the position when the mold material M is press molded and the position when the optical element O after molding is taken out from the die set 10B.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of obtaining an optical element by molding, the method comprising:

preparing a die set including an upper die having an upper molding surface, a lower die having a lower molding surface, a side die in which a through hole serving as a side molding surface is formed, and a sleeve configured to accommodate the upper die, the lower die, and the side die;

disposing a mold material on the lower molding surface after inserting the lower die into the through hole of the side die such that the lower molding surface is positioned in the through hole of the side die;

heating the mold material disposed in the through hole of the side die;

molding the optical element by press molding the mold material with the upper die and the lower die by pushing the side die upward using the lower die to integrally move the side die and the lower die with respect to the upper die and the sleeve in a state where a position of the lower molding surface in the through hole of the side die is maintained at a predetermined position; and pushing the optical element upward by raising the lower die with respect to the side die and the sleeve to move the lower molding surface in the through hole of the side die to a position which is higher than the predetermined position and at which a part of the optical element after molding protrudes from an upper surface of the side die, wherein:

the lower die has a first surface having a first stepped shape, the side die has a second surface facing the first surface of the lower die, and the second surface has a second stepped shape which can be fitted into the first stepped shape of the first surface of the lower die, the pushing upward of the optical element includes switching an orientation of the second stepped shape of the side die with respect to an orientation of the first stepped shape of the lower die to an orientation in which the first stepped shape and the second stepped shape become fitted into each other, to move the lower molding surface in the through hole of the side die, one of the first surface and the second surface includes a protrusion portion, and the other of the first surface and the second surface includes a recess portion having a shape corresponding to a shape of the protrusion portion and a portion in which the recess portion is not formed, the press molding of the mold material is performed in a state where the portion in which the recess portion is not formed is in contact with the protrusion portion, and the pushing upward of the optical element includes rotating one of the lower die and the side die to bring the recess portion into contact with the protrusion portion to move the lower molding surface in the through hole of the side die.

2. The method according to claim 1, further comprising:
replacing air in the through hole of the side die with an inert gas in a state where the upper molding surface is positioned out of the through hole of the side die, before the heating of the mold material.

3. The method according to claim 2, wherein the replacing of the air is performed in a state where a distance between the upper surface of the side die and the upper molding surface is set to be smaller than a thickness of the mold material.

\* \* \* \* \*